United States Patent
Bohn

(10) Patent No.: US 8,371,509 B2
(45) Date of Patent: Feb. 12, 2013

(54) CHIP MODULE FOR AN RFID SYSTEM

(75) Inventor: Martin Bohn, Reutlingen (DE)

(73) Assignee: bielomatik Leuze GmbH + Co.KG, Neuffen (DE)

(*) Notice: Subject to any disclaimer, the term of this patent is extended or adjusted under 35 U.S.C. 154(b) by 376 days.

(21) Appl. No.: 12/602,415

(22) PCT Filed: Sep. 3, 2008

(86) PCT No.: PCT/EP2008/007171
§ 371 (c)(1),
(2), (4) Date: Nov. 30, 2009

(87) PCT Pub. No.: WO2009/030463
PCT Pub. Date: Mar. 12, 2009

(65) Prior Publication Data
US 2010/0187316 A1    Jul. 29, 2010

(30) Foreign Application Priority Data
Sep. 4, 2007 (DE) .......................... 10 2007 041 752

(51) Int. Cl.
*G06K 19/02* (2006.01)

(52) U.S. Cl. ..................................... 235/488; 340/572.7
(58) Field of Classification Search .................. 235/488; 340/572.7
See application file for complete search history.

(56) References Cited

U.S. PATENT DOCUMENTS

| 2007/0052613 A1 | 3/2007 | Gallschuetz et al. ......... 343/860 |
| 2008/0246007 A1* | 10/2008 | Gellrich ........................ 252/500 |
| 2009/0079574 A1* | 3/2009 | Oroku et al. ................ 340/572.7 |
| 2010/0001862 A1* | 1/2010 | Wilson et al. ............. 340/572.1 |

FOREIGN PATENT DOCUMENTS

| CA | 2668973 | 5/2008 |
| DE | 102006052517 | 5/2008 |
| DE | 102007026720 | 12/2008 |

* cited by examiner

*Primary Examiner* — Allyson Trail
(74) *Attorney, Agent, or Firm* — Andrew Wilford

(57) ABSTRACT

The invention relates to a chip module for an RFID system comprising a web-type or sheet-type support material (4) on the upper face of which a coupling antenna (2) and an RFID chip (3), which is electrically, especially galvanically, connected to the coupling antenna (2), are arranged and the lower face of which is provided with an adhesive layer (9). The coupling antenna (2) consists of an aluminum layer (7) having a thickness of 1 μm-20 μm, especially of 3 μm-12 μm.

5 Claims, 9 Drawing Sheets

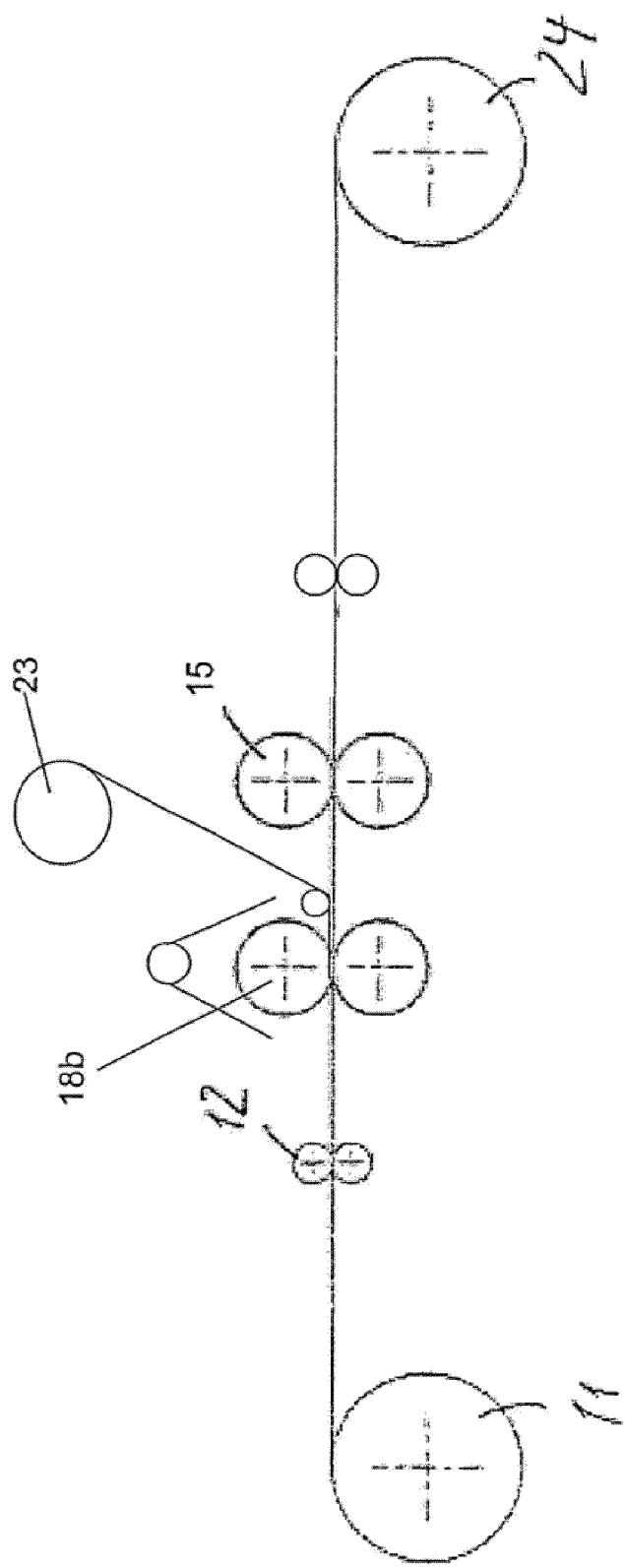

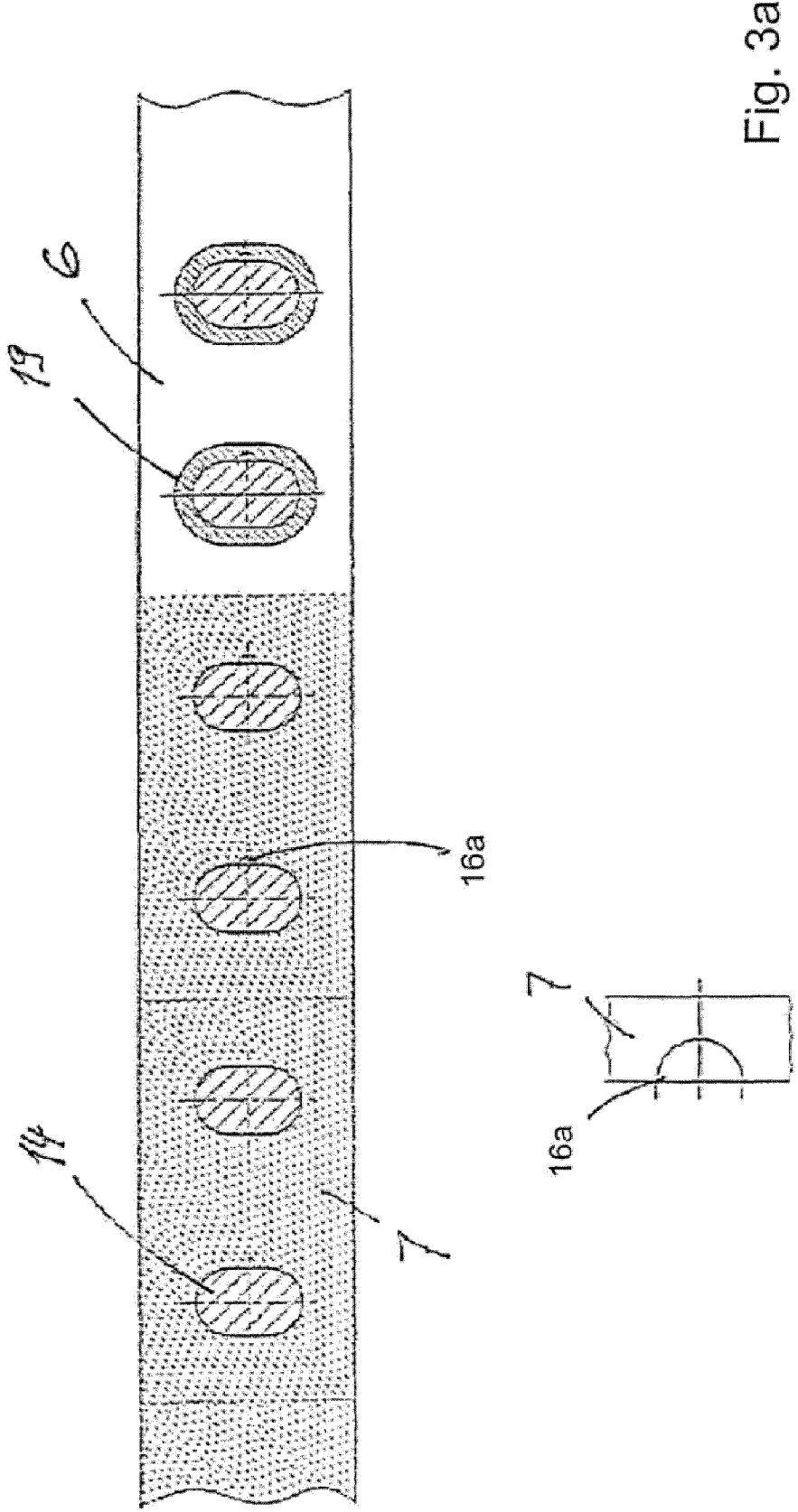

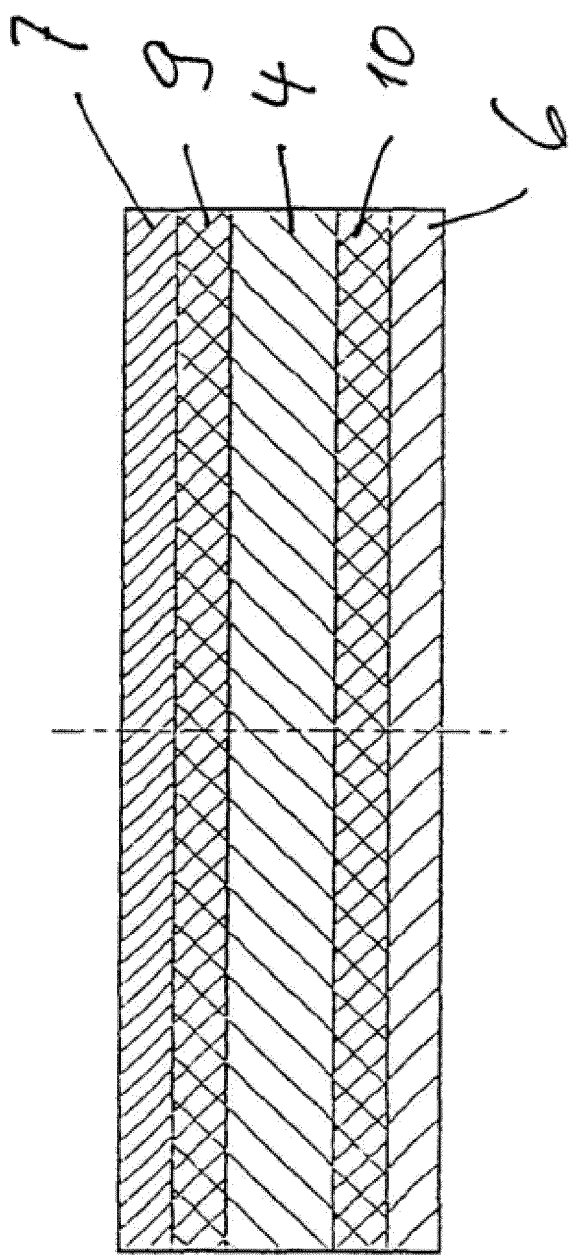

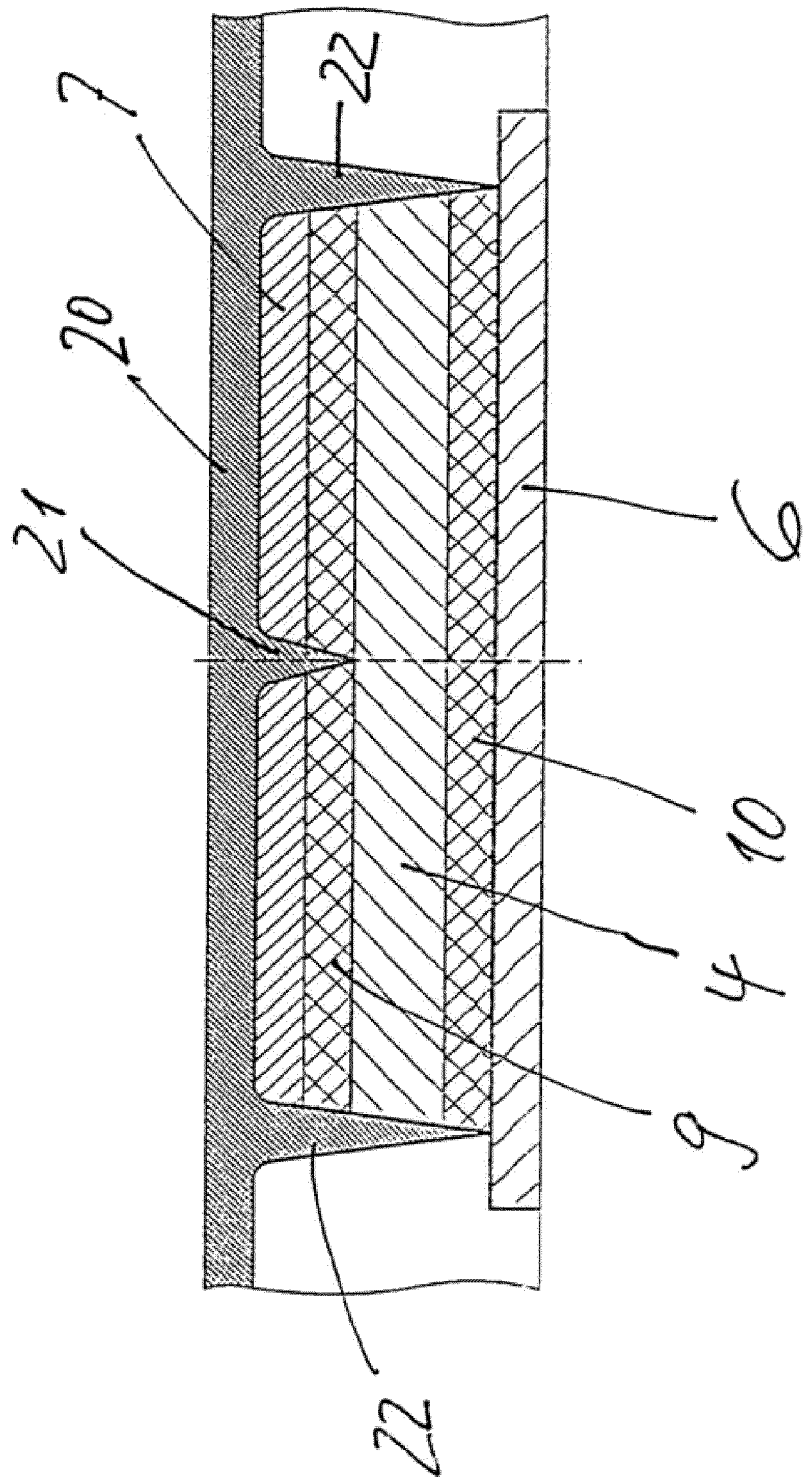

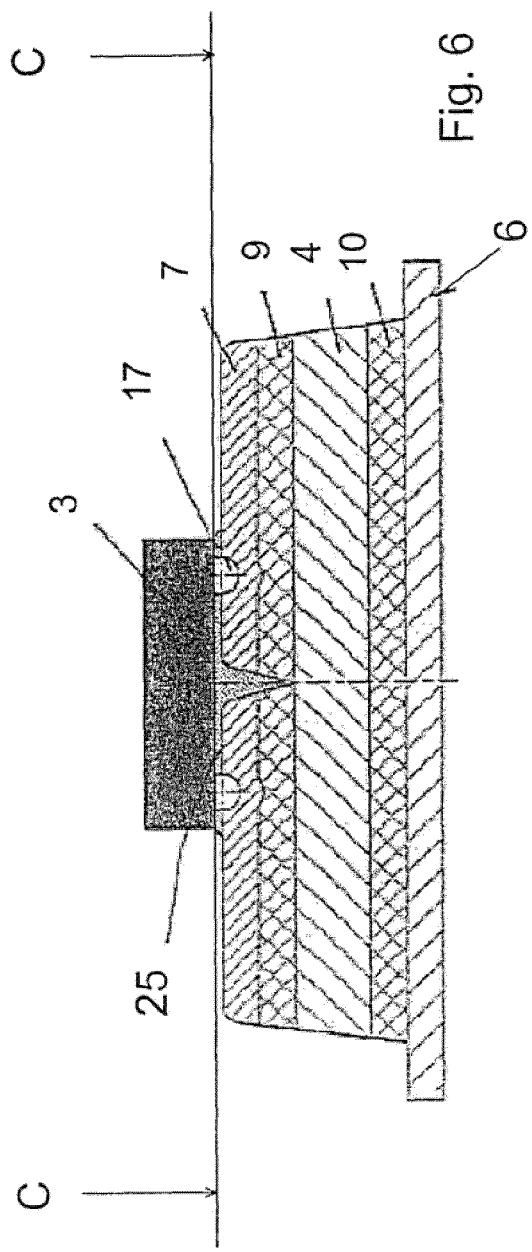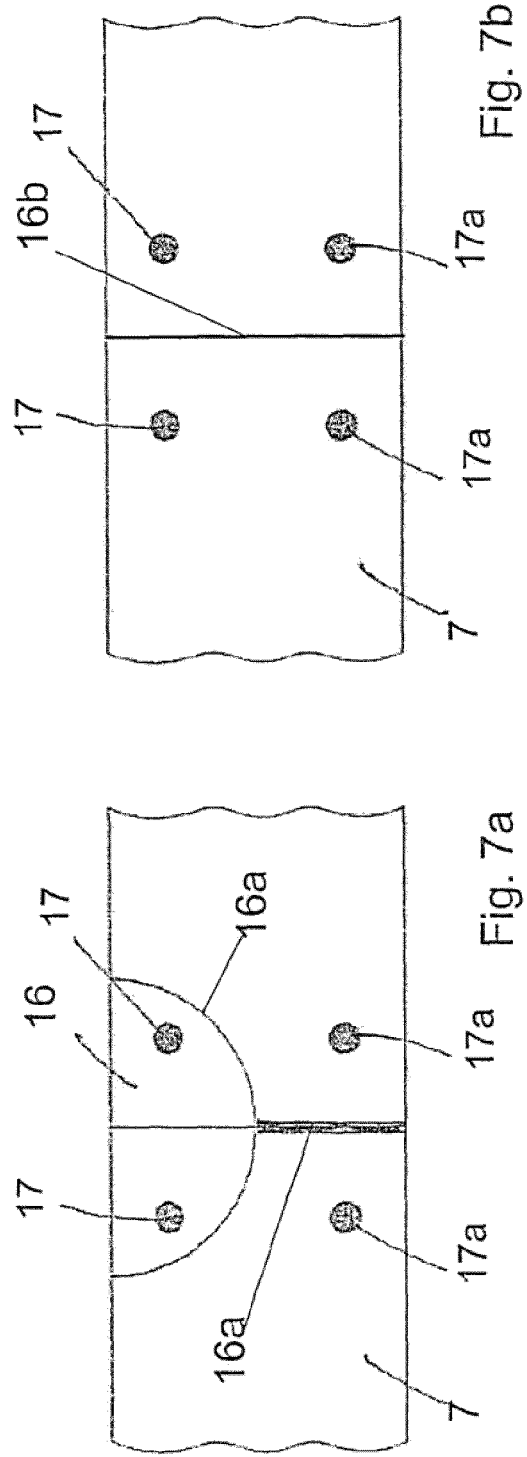

CHIP MODULE FOR AN RFID SYSTEM

CROSS REFERENCE TO RELATED APPLICATIONS

This application is the US-national stage of PCT application PCT/EP2008/007171, filed 3 Sep. 2008, published 12 Mar. 2009 as WO2009/030463, and claiming the priority of German patent application 102007041752.9 itself filed 4 Sep. 2007.

FIELD OF THE INVENTION

The invention relates to a chip module for an RFID system, an RFID system having the chip module, and a self-adhesive RFID label, as well as to a method for making it.

BACKGROUND OF THE INVENTION

In the manufacture of RFID labels, so-called chip modules are used that have an RFID microchip and electrical connector contacts with which they are connected with an antenna. German patent application 10 2006 052 517 describes a chip module of this type where an RFID chip and a coupling antenna connected with the RFID chip electrically, in particular galvanically, are mounted on a support sheet. Using the chip module, RFID labels are made in which a chip module mounted on a support foil/film is glued onto a secondary antenna, positioned in such a way that the coupling antenna and the RFID antenna are inductively coupled.

In German patent application 10 2007 026 720, a self-adhesive antenna for an RFID system is described that is punched out of an aluminum foil having a thickness of 1 µm-20 µm, in particular approximately 10 µm, and glued onto the front of an adhesive film.

OBJECT OF THE INVENTION

The object of the invention is to create a chip module of this type that allows an environmentally friendly RFID system to be made having predominantly recyclable materials, such as aluminum and paper.

SUMMARY OF THE INVENTION

This task is attained in that the coupling antenna consists of an aluminum layer having a thickness of 1 µm-20 µm, in particular of 3 µm-12 µm.

According to the invention, it is advantageous that the support web or sheet is an adhesive material having a support layer made of paper.

The coupling antenna can be cut out, in particular punched out, from an aluminum foil, in a cost-advantageous and environmentally friendly manner. Alternatively, it is also possible to print the coupling antenna using a printing ink that contains aluminum.

According to the invention, the in the RFID system, the coupling antenna and a secondary antenna of the system are inductively coupled. It is particularly advantageous that the secondary antenna is also made from recyclable aluminum, and that the antenna foil/film for the secondary antenna is an adhesive material having a support layer that is also made of recyclable paper. This also simplifies manufacture of the system, since the number of materials used is limited.

The self-adhesive RFID label according to the invention can be made in an advantageously simplified manner, since the same material is used for the inlay material, including its adhesive film, as for the cover material with the related adhesive film of the label.

An RFID label according to this invention can be made in particularly advantageous manner, in that an adhesive material having a support layer made of paper is used for all the support layers so that the paper can be recycled in an environmentally friendly manner.

BRIEF DESCRIPTION OF THE DRAWING

In the following, the invention will be explained in greater detail with reference to a single FIGURE illustrated embodiments, where characteristics in the different embodiments that agree with one another are provided with the same reference symbols. Alternative characteristics are differentiated with the addition of "a" and "b". In the drawing:

FIG. 2b schematically shows an alternative method.

FIG. 3a is a top view showing the steps for making the coupling antenna in the method according to FIG. 2a.

FIG. 4 shows the structure of the aluminum/adhesive material from which the coupling antennas are made.

FIG. 5 shows punching of the coupling antennas.

FIG. 6 shows a section through a chip module.

FIG. 7a shows the section C-C of FIG. 6 in a first embodiment.

FIG. 7b shows the section C-C of FIG. 6 in a second embodiment.

DETAILED DESCRIPTION

Figure 1:
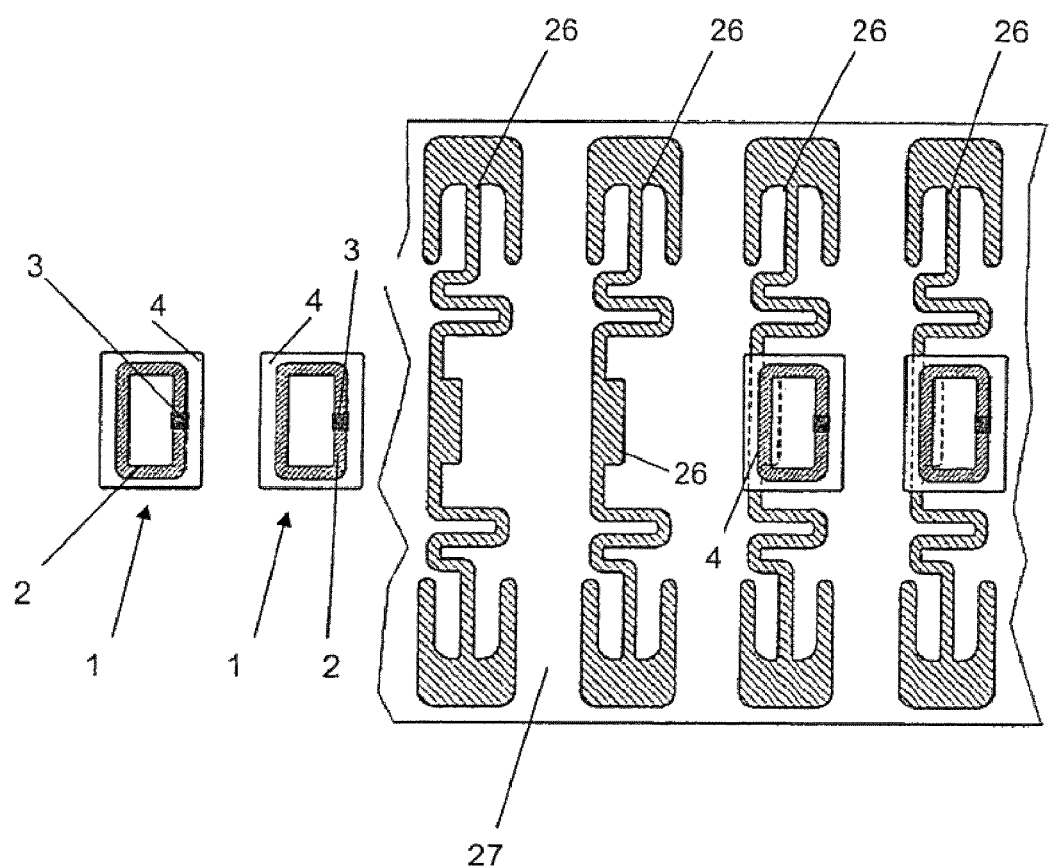
FIG. 1 shows a chip module that is attached to a support film/foil, and its positioning on a secondary antenna.

In FIG. 1, two chip modules 1 are shown, each of them comprising a coupling antenna 2 and an RFID chip 3 mounted on the coupling antenna 2. The RFID chip 2 is connected with the coupling antenna electrically, in particular galvanically. The coupling antenna 2 with the RFID chip 3 is mounted on the upper face of a web or sheet support layer 4. The lower face of the support layer 4 has an adhesive film 10 covered by a strippable sheet 6, preferably silicone paper.

The coupling antenna 2 consists of an aluminum layer having a thickness of 1 µm-20 µm, in particular of 3 µm-12 µm. In the illustrated embodiment, the thickness of the aluminum layer amounts to approximately 10 µm. Preferably, the coupling antenna 2 is cut from an aluminum foil 7 having a corresponding thickness. As shown in the example, this can be done by punching or by cutting with a laser beam. Alternatively, it is also possible to print the coupling antenna 2 onto the support layer 4 using an aluminum-containing ink.

The support layer 4 is preferably made from paper. Also, the support layer 4 can be made from a plastic such as PP or PE. Preferably, a web or sheet aluminum/adhesive laminate is used as the starting material for making chip module; its structure is shown in FIG. 4:

On the upper face of a web or sheet support layer 4 made of paper, an aluminum foil 7 is firmly glued on by an adhesive film 9. On the lower face of the paper layer 4, a strippable sheet made of silicone paper 6 is adhered by an adhesive film 10. First, the coupling antennas 2 are punched out of this aluminum/adhesive laminate in the manner described below.

The aluminum/adhesive laminate consists of an aluminum foil 7 having a thickness of 1 µm-20 µm, in particular 3 µm-12 µm, approximately 10 µm in the example, a support layer made of paper having a density between 50 g/m²-90 g/m², 70 µm in the example, and a strippable sheet made of silicone paper having a thickness of 50 µm-60 µm. The adhesive film 9 underneath the aluminum foil 7 has a thickness of 3 µm-7 µm, approximately 5 µm in the example, and the adhesive film 10 on the lower face of the support film 4 made of paper has a thickness between 15 µm and 25 µm, 20 µm in the example.

Figure 2A:
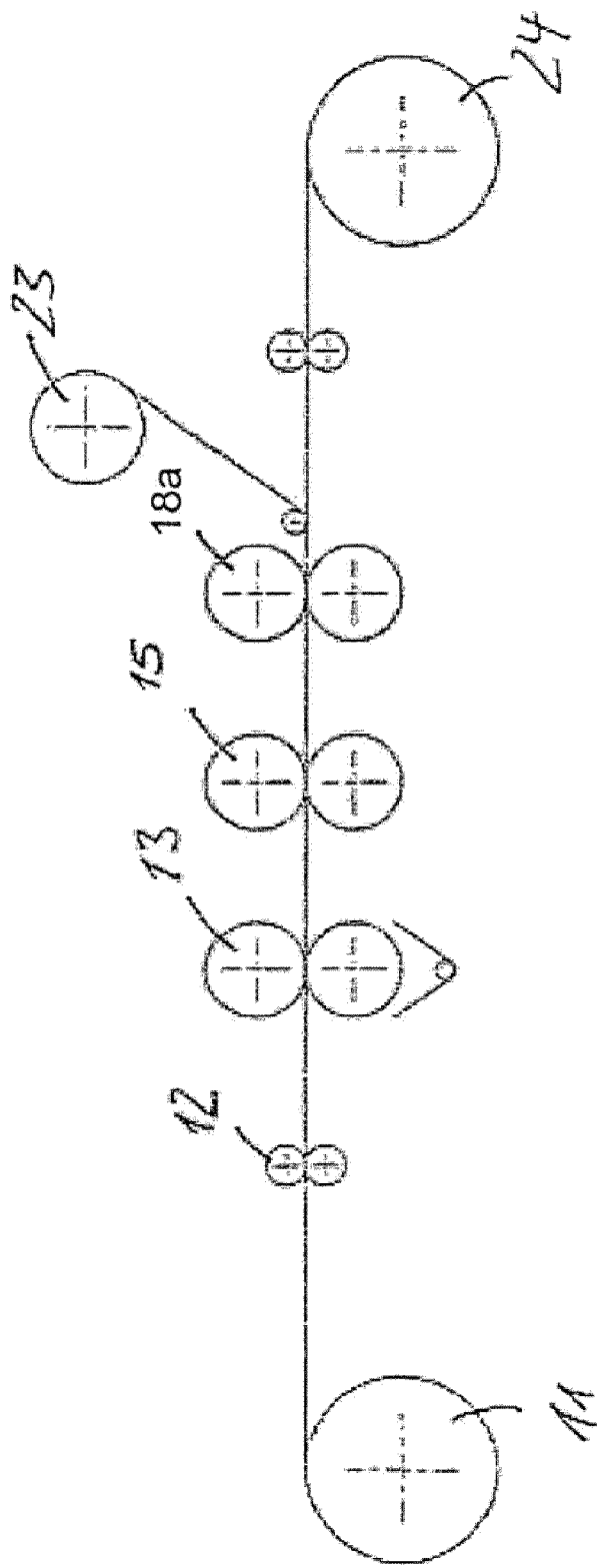
FIG. 2a schematically shows a method for making coupling antennas for the chip module.

As shown in FIG. 2a, the aluminum/adhesive laminate is pulled off a roll 11 by traction rollers 12 and passed to a downstream hole puncher 13. The inner perimeter 14 of the coupling antenna 2 is punched out by the hole puncher 13 with a cut that goes through all the layers of the aluminum/adhesive laminate. As can be seen to the left in FIG. 3a, a hole in the laminate, delimited by the inner perimeter 14, is then situated in the center of a strip. The cutting scrap that results during punching is removed; in the example by suction. In a further downstream puncher 15 the contact location 16a for the RFID chip is then punched out. During this punching process, the cut goes at least through the aluminum foil 7 and the adhesive film 9 underneath it, while the support layer 4 is not completely cut through. This punching step has the task of splitting the coupling antenna 2, which was previously closed in itself, by a cut so that no electrical short-circuit occurs. At the same time, a nonconductive zone is cut out of the aluminum foil 7, in which so-called supportive bumps of the chip 3 can be provided. The regions that are exposed in the aluminum foil 7 during this punching process are shown in FIG. 7a.

Following the puncher 15, another puncher 18a is provided that cuts the outer perimeter 19 of the coupling antenna 2. During this punching process, the cut goes all the way to the strippable sheet 6. In FIG. 2, the punching processes for the contact location and for the outer perimeter are shown in two steps. However, the two punching processes can also be carried out with a single rotating tool, as shown in FIG. 5. The punching tool 20 there has two blades 21 and 22 that cut to different depths, the punching blade 21 cutting out the contact location 21 with a cut that reaches only to the paper 4 used as the support layer and the punching blade 22 cutting out the outer perimeter with a cut that reaches all the way to the strippable sheet 6.

Figure 8:
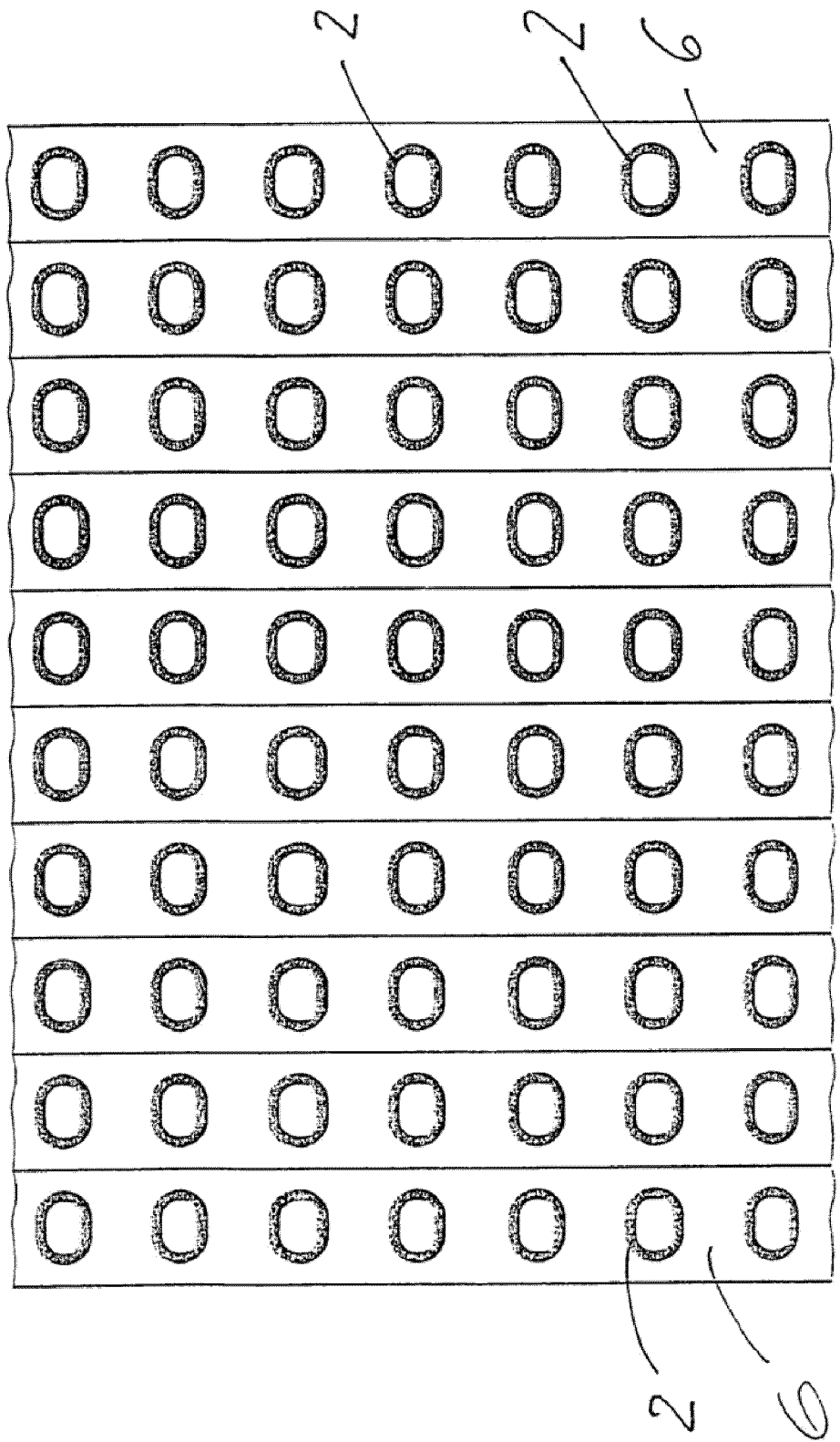
FIG. 8 shows the strip arrangement of the coupling antennas before the chip is attached on them.

After the punching process in the puncher 18a, the punched grid is removed and wound up on a roll 23. The strippable sheet 6 with the coupling antennas 2 on it is wound into a roll 14. As shown in FIG. 8, the coupling antennas 2 are mounted on the strippable sheet 6 one after the other and at a spacing from one another. The film, in turn, is a strip so that the coupling antennas can be fed to downstream processing in several tracks and one behind the other. In the downstream processing step, an RFID chip 3 is attached to each coupling antenna 2 as shown in FIG. 6.

Figure 3B:
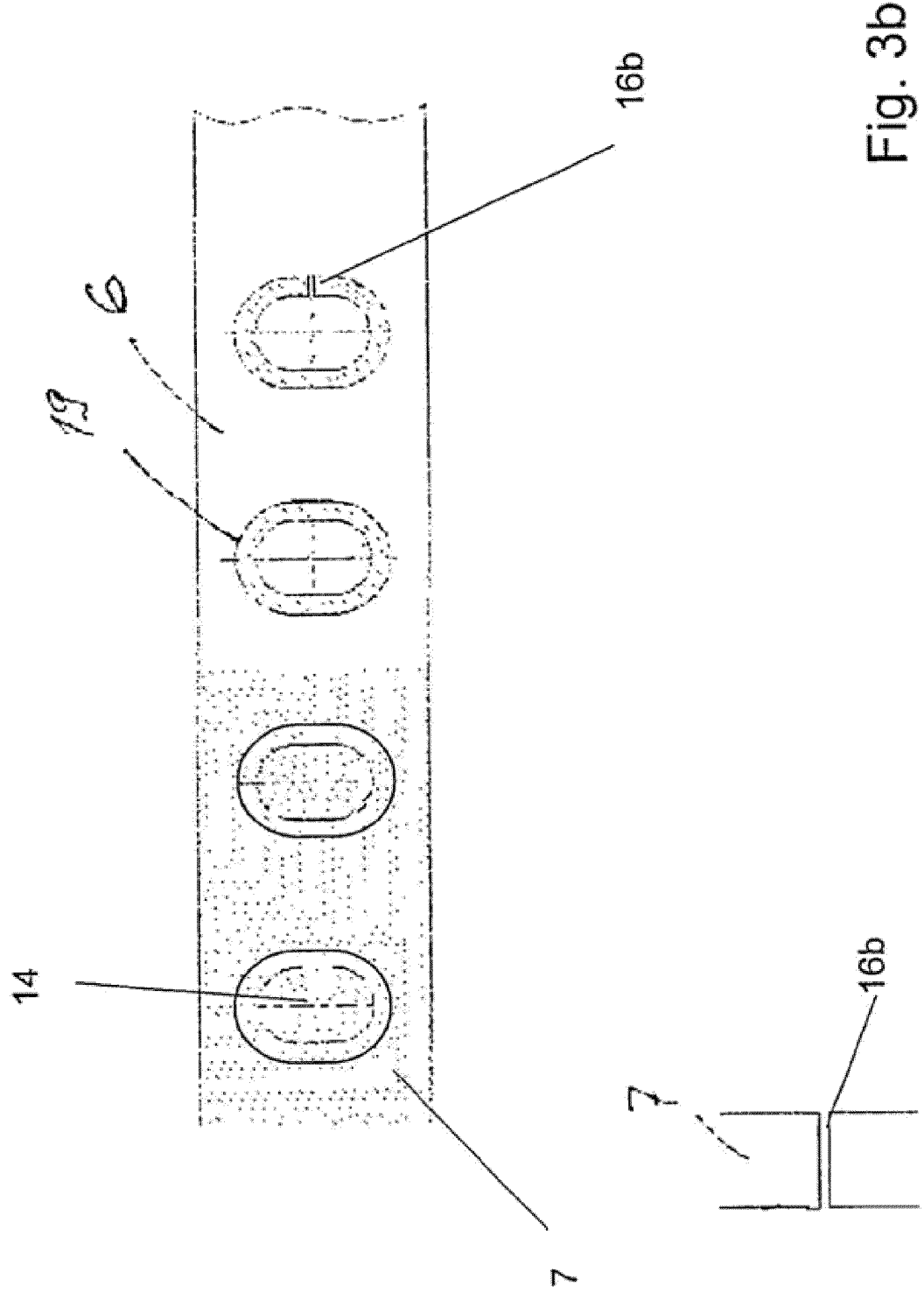
FIG. 3b shows the production steps in the alternative method according to FIG. 2b.

In FIG. 2b, an alternative method is shown in which the inner perimeter 14 and the outer perimeter 19 of the coupling antenna 2 are punched out in one cut that reaches all the way to the strippable sheet 6. In this connection, the inner perimeter 14 is taken away by the punch cylinder and aspirated, and can subsequently be disposed of. Downstream, the contact location 16 for the RFID chip 3 is punched out in the puncher 15; according to this illustrated embodiment—as shown in FIGS. 3b and 7b—it forms a straight separation as a slot 16b.

As shown in FIGS. 6 and 7a, 7b, the aluminum foil 7 in the uppermost layer is the conductive trace of the coupling antenna 2. When chips 3 are put into place, the chip feet, referred to as "bumps" 17, are pressed into the aluminum foil 7 and, if necessary, into the adhesive film 9 that lies underneath it. Thus, a certain shape fit is formed for making galvanic contact with the bumps 17. Before placement of the chips, an adhesive 25 is applied to the contact locations of the coupling antenna 2 that holds the chip 3 in position. This adhesive 25 is normally an expensive, conductive adhesive having silver particles as the conductive substance.

In FIG. 7a, an embodiment is shown in which the contact location 16a contains an approximately semicircular recess that is punched out of the aluminum foil 7. Contact of the aluminum foil 7 with the RFID chip takes place by way of the electrically independent lower bumps 17a that are separated by another cut 16a in the aluminum foil 7 in order to avoid an electrical is short-circuit.

In FIG. 7b, an advantageous alternative possibility is shown for forming the contact location 16 between the coupling antenna 2 punched out of the aluminum foil and the RFID chip 3. In this embodiment, the two upper bumps 17 only serve to support the chip 3; they are not connected with the chip 3 in electrically conductive manner. The electrical contact takes place by way of the two lower bumps 17a. The two contact bumps 17a are electrically separated from one another by a straight-line cut 16b. When the straight-line cut 16b is punched out, the two edges of the foil 7 are crimped apart from one another, so that a parting gap is formed that reliably prevents contact. If necessary for the insulation effect, an insulating adhesive can additionally be pressed into the parting gap 16b; after it hardens, it reliably keeps the edges of the foil 7 at a distance from one another. At the same time, this plastic can advantageously be used to securely attach the bumps 17 and thus the chip 3 on the film 7.

The invention makes it possible to replace the adhesive 25 with a nonconductive, cost-advantageous adhesive. In this connection, it should be noted that an oxide layer of the aluminum that might occur at the contact locations of the coupling antenna 2 does not disrupt the electrical contact. In order to prevent the occurrence of a disruptive oxide layer from the start, an extremely thin layer of protective varnish can be applied to the aluminum foil 7 as oxidation protection. In this connection, the protective varnish is selected in such a manner, in terms of its consistency and its adhesion to the aluminum, that it breaks up when contacted, in other words when the chip 3 is set onto the contact locations of the coupling antenna 2, and exposes a non-oxidized contact surface for a galvanic connection.

The chip module 1 with the chip 3 can be used as an RFID system in very close proximity, since the coupling antenna 2 acts as a UHF antenna. For greater range, the chip module 1, with its support layer 4, is glued onto a flat secondary antenna 26, positioned in such a manner that the coupling antenna 2 and the secondary antenna 26 are inductively coupled. In this connection, the secondary antennas 26 are mounted on the upper face of a support layer, where an adhesive material having a support layer made of paper is preferably used as the support layer. Alternatively, a plastic such as PE or PP can also be used for the support layer. Preferably—as shown in FIG. 1—the adhesive film of the support layer is covered by a strippable sheet or web 27. The secondary antennas 26 are thus mounted on the upper face of the parting material 27. Preferably, the secondary antenna 26 is also made from an aluminum layer having a thickness of 1 µm-20 µm, in particular of 3 µm-12 µm, approximately 10 µm in the example. In this connection, similar to the coupling antenna 2, the secondary antenna 26 is preferably cut out, in particular punched out, from an aluminum foil having a corresponding thickness. Preferably, an adhesive material having a support layer made of paper is used as the support layer for the secondary antenna 26, just like for the coupling antenna 2, in order to keep the number of materials used low, and to use the same materials, if necessary.

The RFID systems that consist of the chip module and the secondary antenna are preferably used for the production of self-adhesive RFID labels. In this connection, an RFID system is provided as an RFID inlay between a web or sheet cover material, provided with an adhesive film on its lower face, and a web or sheet support layer that can be pulled off the adhesive film. In this connection, the same material is preferably used for the RFID inlay, including its adhesive film, as for the cover material having the adhesive film of the label. Particularly preferably, an adhesive material having a support layer made of paper is used for all the support layers. Thus, only paper and aluminum, the latter for the antennas, are used for making the RFID label.

The invention claimed is:

1. A method for the production of a chip module, the method comprising the steps of:
    providing a web or sheet aluminum/adhesive laminate consisting of an aluminum foil layer having a thickness of 1 µm to 20 µm glued onto an upper face of a support layer whose lower face is adhered to a strippable sheet,
    first cutting out an inner perimeter of the coupling antenna with a cut that goes through all the layers of the adhesive laminate to form an inner punched-out scrap and thereafter removing the punched-out inner scrap,
    subsequently, subdividing out the contact location for an RFID chip by a cut that extends through the aluminum foil and the adhesive film that lies underneath it, and cutting out an outer perimeter of the coupling antenna by a cut that is made without cutting through the strippable sheet to form an outer punched-out scrap,
    thereafter, removing the outer punched-out scrap; and
    mounting the RFID chip on the laminate in electrical connection with the foil layer.

2. The method according to claim 1, further comprising the step of:
    punching out the inner perimeter and the outer perimeter of the coupling antenna as well as the contact location for the RFID chip.

3. The method according to claim 1 wherein the insulating cut at the contact location is carried out as a straight-line cut.

4. The method according to claim 1 wherein
    the support layer is made of paper having a strength between 50 g/m$^2$ and 90 g/m$^2$,
    the strippable sheet is made of silicone paper having a thickness of 50 µm-60 µm,
    the aluminum foil is glued onto the support layer by an adhesive film having a thickness of 3 µm-7 µm, and
    the silicone support film is glued to the lower face of the support layer by an adhesive film between 15 µm and 25 µm thick.

5. A method for the production of a chip module, the method comprising the steps of:
    providing a web or sheet aluminum/adhesive laminate consisting of an aluminum foil having a thickness of 1 µm to 20 µm and glued onto an upper face of a support layer having a lower face adhered to a strippable sheet,
    cutting out an inner perimeter and an outer perimeter of the coupling antenna to a depth extending all the way to the strippable sheet to form a cut-out scrap,
    subsequently, removing the cut-out scrap of the inner perimeter by suction,
    thereafter mounting an RFID chip on the laminate in electrical connection with the foil layer and making an insulating cut at a contact location of the RFID chip.

* * * * *